US005314264A

United States Patent [19]

Danko et al.

[11] Patent Number: 5,314,264

[45] Date of Patent: * May 24, 1994

[54] METHOD AND APPARATUS FOR UNDERGROUND NUCLEAR WASTE REPOSITORY

[75] Inventors: George Danko; Pierre Mousset-Jones; Richard A. Wirtz, all of Reno, Nev.

[73] Assignee: University of Nevada, Reno, Nev.

[*] Notice: The portion of the term of this patent subsequent to Jan. 7, 2009 has been disclaimed.

[21] Appl. No.: 728,672

[22] Filed: Jul. 12, 1991

Related U.S. Application Data

[63] Continuation-in-part of Ser. No. 504,612, Apr. 4, 1990, Pat. No. 5,078,958.

[51] Int. Cl.[5] ........................ B09B 1/00; E21D 21/00

[52] U.S. Cl. ........................ 405/128; 405/259.1; 588/250

[58] Field of Search ........................ 405/53, 55, 56, 128, 405/129, 132, 259.1; 166/57; 252/633; 376/272, 273, 274, 276, 367; 588/249, 250

[56] References Cited

U.S. PATENT DOCUMENTS 1,119,427 12/1914 Hall ........................ 405/132 X
3,864,208 2/1975 Van Huisen ........................ 376/276
4,040,480 8/1977 Richards ........................ 166/57
4,586,849 5/1986 Hastings ........................ 405/128
4,652,181 3/1987 Bergman et al. ........................ 405/128
4,701,280 10/1987 Canevall ........................ 252/633
4,708,522 11/1987 Bergman et al. ........................ 405/55
4,851,183 7/1989 Hampel ........................ 376/274
5,078,958 1/1992 Danko et al. ........................ 376/272

*Primary Examiner*—David H. Corbin
*Attorney, Agent, or Firm*—Handal & Morofsky

[57] ABSTRACT

The present invention relates to the retrievable storage of high-level nuclear spent fuel. Such waste, which generates heat as it decays, is packed in sealed containers (2) which are placed in a repository site comprising a tunnel or drift (5) in a geological rock formation (50) for permanent or long-term storage. Elongated, sealed cooling enhancement devices (7) are emplaced in boreholes (8) extending from the inside surfaces (16*a*–*b*) of the drift (5) and carry heat from the location of the waste containers (5) to farther distances in the repository site. Applicable sealed cooling enhancement devices disclosed are heat pipes (7), thermal syphons (307), superconductor rods, and heat pumps (407). In accordance with a preferred embodiment, conventional mining rock bolts which are hollowed contain a cooling enhancement choice.

10 Claims, 13 Drawing Sheets

METHOD AND APPARATUS FOR UNDERGROUND NUCLEAR WASTE REPOSITORY

CROSS-REFERENCE TO RELATED APPLICATION

This application is a continuation-in-part of U.S. patent application Ser. No. 07/504,612 filed Apr. 4, 1990, now U.S. Pat. No. 5,078,958.

TECHNICAL FIELD

The present invention relates to the retrievable storage of high-level nuclear spent fuel (waste) in which the waste, generating heat as it decays, is packed into sealed containers which are then placed into a repository site in a geological rock formation for permanent or long-term storage.

BACKGROUND

It is critical to the future of nuclear power to solve the problem of long-term storage of high-level nuclear spent fuel. In connection with this, the nation's first underground waste repository site is proposed to be constructed in a formation of unsaturated welded tuff (a very hard igneous or volcanic rock) at Yucca Mountain, Nevada. The concept is the subject of public and scientific criticism, partly because local future climate and seismic events are uncertain. In addition, there are risk factors associated with the breakdown of the natural geological and the associated man-made barrier systems. Other concerns are possible future complications attending retrieval of the waste from the site for reprocessing, or alternative storage emplacement.

Two different waste emplacement layout approaches have been considered by the U.S. Department of Energy (DOE) in order to distribute heat generating waste evenly over an appropriate underground area in Yucca Mountain. The long, horizontal emplacement approach assumes long horizontally driven holes which are 100 to 200 meters in length, in which 14 to 18 canisters could be emplaced in series. Canisters are 0.7 meters in diameter and five meters high. This layout has the advantage of low drift wall temperatures, since heat is transferred directly into the rock heat sink area, farther from the surface of a drift. However, this approach presents emplacement and retrieval problems, and in response to these concerns, the long, horizontal emplacement concept has been rejected.

Currently, only the short vertical or horizontal hole approach is being considered. While short holes provide for easy retrieval, they also have disadvantages, namely, (1), the heat source is close to the surface of the emplacement drift or underground tunnel and extensive ventilating air is needed to cool down the drift wall for regular maintenance or retrieval, and (2) a large amount of underground excavation is needed to spread the heat load evenly over the waste site area, resulting in excessive construction and operating costs and an increased risk of failure in the engineered or geological barrier systems. Waste storage using tubular waste containers and an open air circulation system such as this is described in the U.S. Pat. No. 4,713,199, where the containers are emplaced into vertical holes of a concrete block incorporating channels and cooling is provided by air flowing between the containers and the channel wall.

Other suggested layouts and arrangements, however, can provide for easy retrieval. The following possibilities have been suggested by the Nuclear Regulatory Commission; single-package instead of multi-package emplacement, short holes and floor trenches, or alcoves in the drift wall. While these arrangements are advantageous for low-level nuclear waste, they are not suitable for high-level waste storage, because of the high heat and radioactive radiation load. One approach to the problem is described in U.S. Pat. No. 4,834,916, again using convective air cooling, with all its attendant problems, and where waste is stored in tubes placed within a room having at least one cold air inlet and a hot air outlet.

The methods described in the foregoing employ so-called open-loop ventilation circuits to control the temperature of the waste container and the storage area. Open-loop ventilation is potentially hazardous when applied to high-level waste, since contamination can be released from a leaking container. In addition, such systems also usually involve the added energy costs of providing a source of cooled air.

There are other methods for the removal of decay heat. A heat sink in the form of a heat conducting rod extending substantially along the length of a spent fuel rod is described in U.S. Pat. No. 4,326,918. Here the decay heat is conducted away from a sealed storage assembly for spent nuclear fuel.

A sealed storage complex is described in the U.S. Pat. No. 4,725,164, where the amount of excavation is minimized for safety purposes. An elastoplastic filling material is used which conducts the heat of the waste to the site area. Another two-phase cooling circuit is described in U.S. Pat. No. 3,706,630. In accordance with this patent, the decay heat is removed by water evaporation from the fluidic form of waste during disposal. The vapor travels through a closed pipeline to a surface-based cooler to condense. The condensate is reused, after mixing with the waste and pumped back to the site. This solution represents a two-phase cooling system with a cooler on the surface, which is potentially hazardous, requires utilities, operating personnel and maintenance.

SUMMARY OF THE INVENTION

The invention is intended to provide a remedy. In accordance with the invention, long-distance, sealed cooling enhancement devices are positioned in boreholes and drilled from the location of the waste containers to carry heat to farther distances in the repository site, prior to emplacement of the containers. Cooling enhancement devices in the form of heat pipes, thermal syphons, or heat pumps may be employed in connection with the inventive system.

The main objective of developing a new waste storage method is to obtain a highly concentrated container emplacement while maintaining a reduced surface temperature. This is achieved using a closed-loop cooling enhancement system, which transfers heat from the immediate area surrounding the container to a more distant location. The system uses long cooling enhancement devices emplaced into borehole drilled between the location of the containers and leading to more distant areas of the repository site prior to the emplacement of the waste containers. In this way, the physical location of a waste container and the location of its heat sink are separated.

This method has the following advantages: (1) the volume of underground development (i.e. the amount of architecture that must be constructed) needed for the radioactive waste emplacement can be reduced significantly. Reductions of 60–70%, from that in the plan currently proposed for Yucca Mountain, will still maintain the same number of waste containers and repository area, (2) the emplacement drift surface temperature can be reduced significantly, i.e., by 20-30%, assuming no additional cooling by ventilating air, (3) the geological barrier system will be more effective, due to reduced excavation, (4) there will be a reduced demand on ventilation, due to the reduction in the number of emplacement drifts, (5) the retrieval of the waste will be simpler, due to the more concentrated emplacements in short vertical or short horizontal holes, and (6) the geomechanical stability of the site will be stronger, and less maintenance will be needed. These advantages result in a significantly reduced risk when operating the site, and a major reduction in construction and operating costs.

The above advantages are made possible by increasing the density of containers containing spent nuclear fuel and emplaced in close proximity to each other within the walls or floor of the drift tunnel. While this sort of arrangement results in concentrating the amount of heat to be dissipated in the proximity of the drift, the drift is significantly shorter. The heat dissipation problem is addressed by drilling numerous small diameter holes out the sides of the drift and locating therein appropriate heat dissipating structures.

In accordance with the preferred embodiment, these structures are self-powering simple structures with a minimum of operating elements to assure long life, reliable and maintenance free-operation. While the inventive system does require the drilling of numerous boreholes for the heat dissipating apparatus, the heat dissipating apparatus is capable of being positioned in small diameter boreholes. Thus, the boreholes may be drilled at minimal cost, as compared to the high cost of conventional drill and blast mining tunnel fabrication techniques.

These techniques are extremely dangerous to execute, increase the likelihood of damage to the formation, and have exceptionally high cost due to the nature of the drill and blast technique. Drill and blast mining techniques generally involve the drilling of holes for the placement of dynamite, the ignition of the dynamite, the clearing out of the broken rock and the advancement of the tunnel by repeating the process.

Not only is the inventive structure advantageous from the standpoint of initial cost, but the concentrated placement of spent nuclear waste material results in increased accessibility as compared to prior art systems. Thus in the event of servicing, reemplacement or the like, the inventive system represents a substantial improvement over the prior art.

The principal advantage of using cooling enhancement to disperse container waste heat is the feasibility of concentrating the containers into a smaller mined-out area, with the resultant advantages mentioned earlier. Furthermore, cooling enhancement can be applied to the conventional, low-density layout to reduce drift surface temperatures, and reduce or completely eliminate the need for air cooling during maintenance, monitoring or waste retrieval.

A variety of new, concentrated container distribution layouts can be considered using long cooling enhancement devices as heat bridges between the containers and the rock mass acting as a heat sink. Four passive cooling enhancement techniques are disclosed herein, namely: (1) heat pipes, (2) gravity-assisted heat pipes (also known as two-phase thermal syphons), (3) liquid-circulating one-phase thermal syphons, and (4) superconductor rods. These techniques do not require power input. However, enhanced operation can be achieved by using pumps to increase the flow of coolant in techniques 1-3, above.

It is also possible to apply active enhancement techniques such as heat pumps which are able to carry heat from a lower to a higher temperature location for the cost of the extra power input. The power input is often in the form of a heater, e.g. in absorption refrigerators. Therefore, it is feasible to realize a cooling enhancement device in the form of a heat pump, wherein the power input comes directly from the nuclear decay heat of the waste containers.

BRIEF DESCRIPTION OF THE DRAWINGS

The objectives and features of the invention will become apparent from the more detailed description which follows and from the accompanying drawings, which disclose only a few alternative embodiments in which:

FIG. 1(*b*) is a side plan view along lines 1(*b*)—1(*b*) of FIG. 1(*a*);

BEST MODE FOR CARRYING OUT THE INVENTION

Figure 1A:
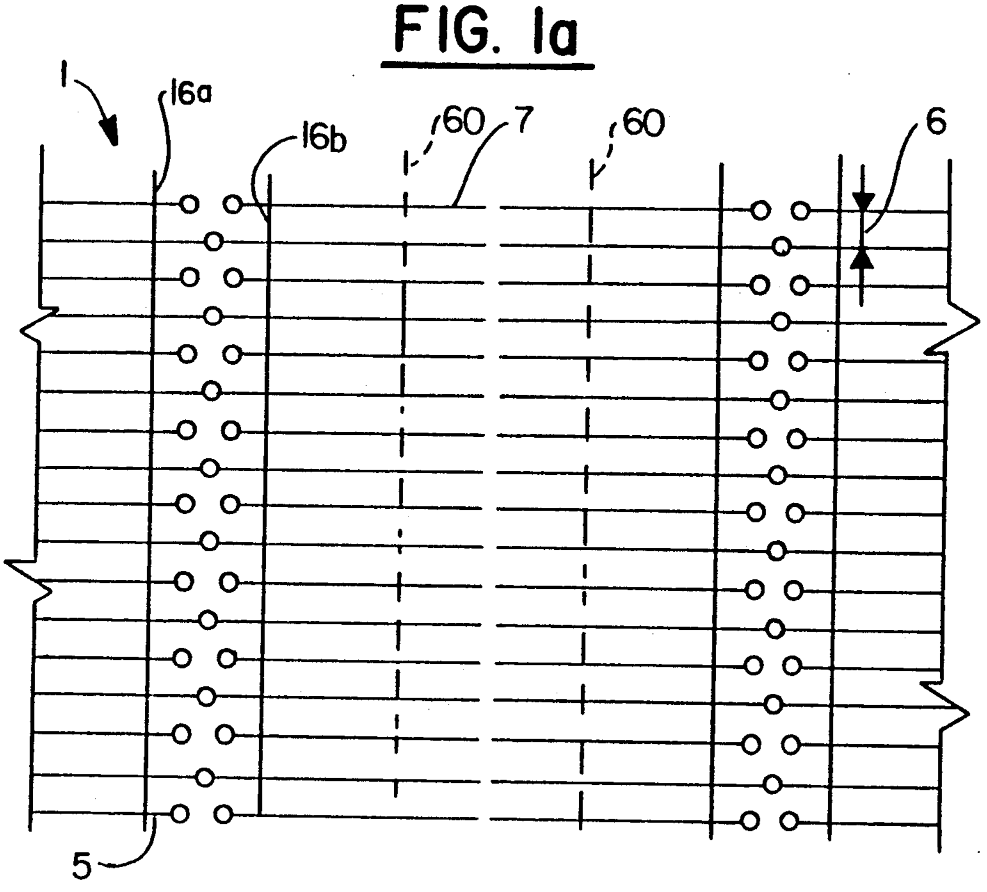
FIG. 1(*a*) is a top plan schematic view of an arrangement of vertical waste containers using the inventive long cooling enhancement devices in accordance with the present invention.
Figure 1B:
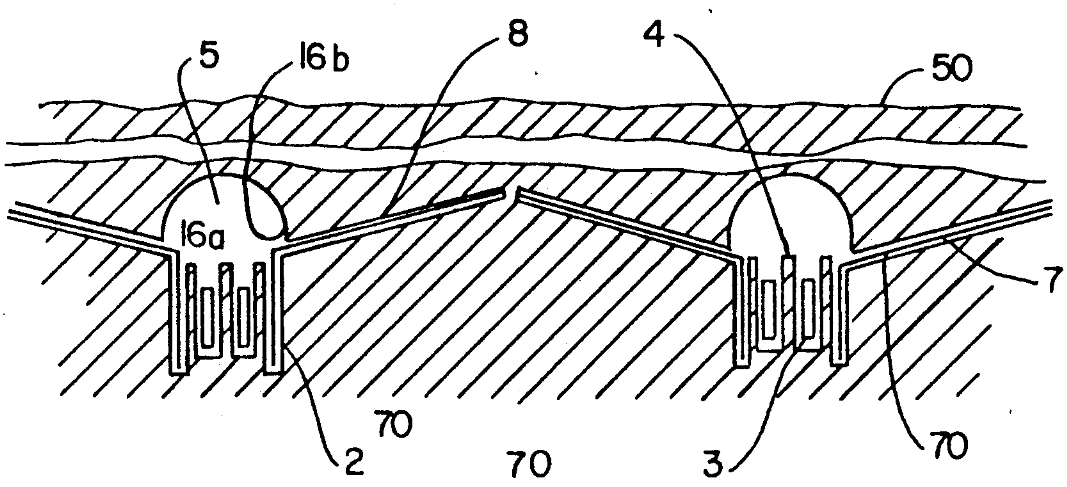

FIGS. 1(*a*) and 1(*b*) show a first preferred example of a section of a vertical repository area 1. Cylindrical heat generating waste containers 2 have a diameter of 0.7 meters and a height of four meters. Containers 2 are emplaced in five meter deep cylindrical borehole 3 driven into the floor 4 of tunnels or emplacement drifts 5. Boreholes 3 have a diameter of 0.76 meters. An air gap is provided between the walls of the borehole 3 and containers 2. In this example, heat pipes are used as cooling enhancement devices 7 which may simply be an elongated tube which is closed at both ends and is about one-third filled with a liquid such as water. The heat pipes are emplaced in a regular array of parallel, sixty meter long horizontal, or vertical or inclined drill holes 8 to provide gravity assistance for the heat pipe circulation system. Drill holes 8 have a diameter of about ten centimeters and are thus made by simply drilling. This is compared to the drift tunnels, which may only be made by drilling holes for dynamite and blasting the material away. This is because the drift tunnels are 6.7 meters high and 6.1 meters wide from wall 16*a* to wall 16*b*.

A conventional heat pipe, as described in the literature, removes heat from the hot end by evaporation and convects this heat by vapor flow towards the cold end, where condensation takes place. The condensed liquid migrates back to the hot end in a wick structure inside the tube under capillary pressure and ordinary piezometric head. Gravity-assistance can be easily provided by emplacing the heat pipes into slightly inclined boreholes. In this way, the heat pipes operate in a two-phase thermal syphon mode, and the wick structure plays only a stabilizing role to optimize the fluid inventory and minimize entrainment which is a known limitation in the operation of a heat pipe.

Figure 2:
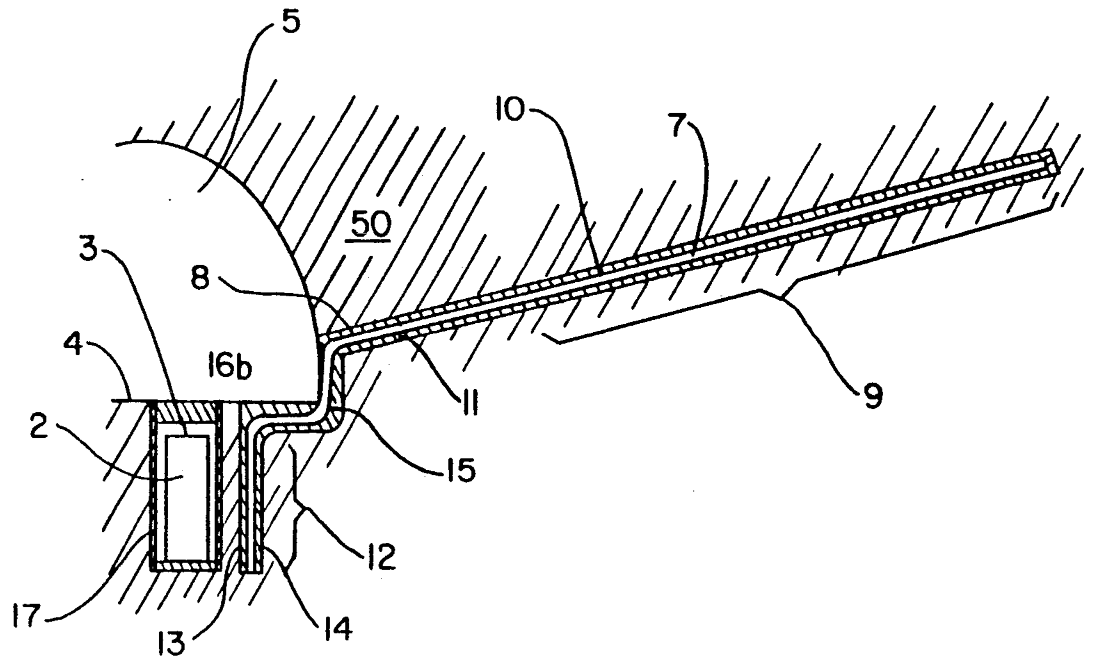
FIG. 2 is a heat pipe connected to a vertical container in accordance with the embodiment of FIG. 1(*a*)

FIG. 2 shows, in detail but with relative proportions exaggerated for clarity of illustration, the interfacing of a heat pipe to the repository. The long drill hole for a heat pipe 7 is 0.05–0.1 meters in diameter, hosting the 0.025 meter diameter pipe. The gap between the heat pipe and the borehole wall along the cooling section 9 is packed with a heat-conducting fill 10, except for the first eight meter section, where the gap is filled with heat insulation 11. The hot end 12 of the heat pipe is parallel with the container 2 and in close thermal contact with the container emplacement hole liner 17. This hot end 12 is cemented into the vertical hole 13 using a heat conducting fill 14. Flexible-wall segment 15 is used in the heat pipe around the bending section for easy installation.

At the site of the container containing spent fuel, up to approximately 3000 watts of heat is to be dissipated. Thus, elongated heat dissipation devices in the range of 10–200 meters in length are contemplated.

In accordance with the present invention it is also contemplated that robotic means may be employed to service the repository site. The operation of said robotic means may be facilitated through the use of a pair of tracks 70, as illustrated in phantom lines in FIG. 1(*b*).

All of the structures illustrated in FIGS. 1(*a*), 1(*b*) and 2 are all drilled in the solid volcanic rock or tuff. Thus, the structure is extremely strong and reliability during the anticipated life of the repository can be expected. At the same time, the nature of this material underscores the above-discussed importance of minimizing the amount of blasting and excavation which must be undertaken to construct the repository system. In connection with this, it is noted that the inventive system saves approximately two-thirds of the work which would normally be involved in constructing the site.

As a result of the arrangement, shown in FIG. 1, three times more containers are emplaced in the same length by reducing the distance 6 between the emplacement borehole 3 and emplacing six containers in a length formerly occupied by two containers in the conventional arrangement proposed by the DOE in the current Site Characterization Plan for Yucca Mountain, Nev. Phantom lines 60 show where additional drifts would be required by prior art systems. Since this concentrated emplacement triples the number of containers per length of drift, two drifts from the original layout can be removed from between the new emplacement drifts. In this example, the number of heat pipes exceeds the number of containers in order to provide a simple and symmetrical arrangement. However, this ratio may not be necessary since a heat pipe can transport several kilowatts of heat and serve more than one container.

Figure 3:
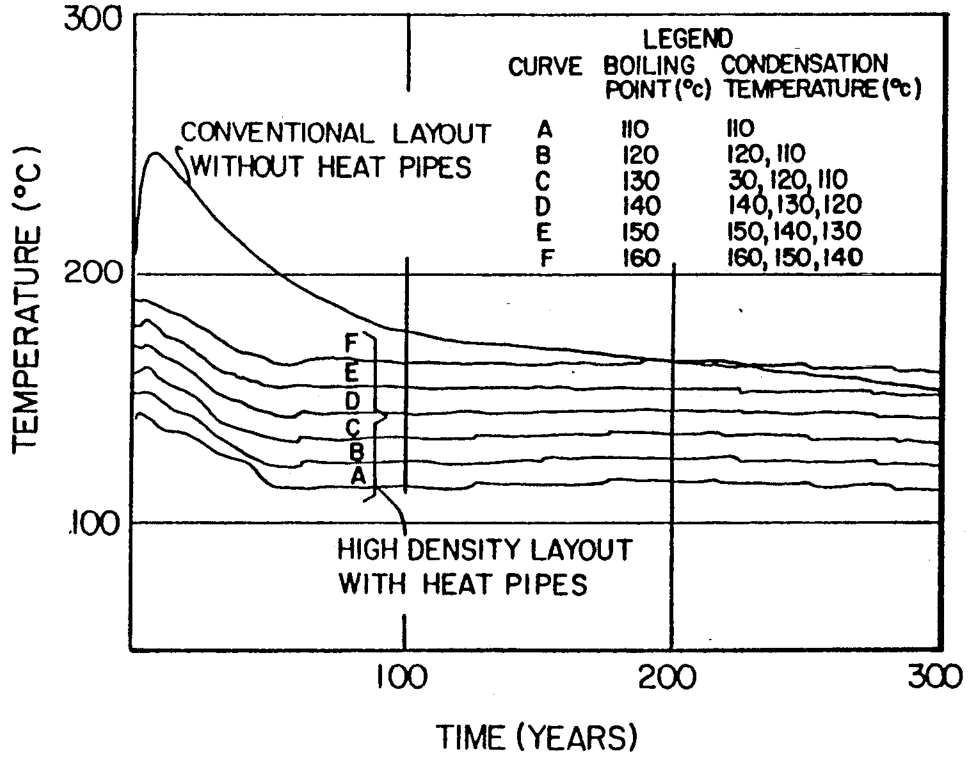
FIG. 3 is graphical representation of the operational characteristics of the system of FIG. 1(*a*) showing the container borehole hot-spot temperature for the arrangement shown in FIG. 1(*a*)

This layout has been experimentally verified as effective using a computer simulation. FIG. 3 compares the inventive system's container borehole hot-spot temperatures to those of the prior art. The borehole hot-spot at which temperatures are measured is a point on the side of the borehole which is two meters from the bottom of the borehole, i.e. opposite the center of the storage container. Computer simulation has shown that good operation is achieved using water-filled heat pipes with 130° C. evaporation and 110° C. condensation temperatures. These temperatures correspond to 0.143 MPa (20.8 psia) vapor pressure along the cooling section, and a 0.1 MPa (14.5 psi) overpressure around the hot end. The two contributing factors to this overpressure are the pressure loss to maintain the vapor flow, and the pressure head due to the inclination of the gravity-assisted heat pipes. Therefore, these parameters provide favorable values for the heat pipe operation and design, which is self-contained and can be carried out by a skilled person. The present invention results in a significant reduction on the order of 27% in the peak temperature at the hot-spot of the container in spite of the 300% higher container concentration along the length of an emplacement drift.

Generally, the inventive method is implemented by excavating access tunnels to the site of the drift, some 200 meters below the surface of the area. The drifts are then excavated and holes cut for containers 2 and boreholes drilled for enhancement devices 7. After the enhancement devices are installed, waste can be stored in the system.

During operation of the inventive system, decaying nuclear waste in container 3 tends to generate heat which is conducted to the sidewalls of borehole liner 17, heating up the surrounding regions of the tuff 50 adjacent to hot end 12. This results in liquid in the hot end boiling and evaporating (and possibly even carryng some of the liquid) into the upper region of pipe 7. Here the vapor gives up its heat up to the region of the tuff formation 50 surrounding cooling section 9 by being conducted through heat conducting fill 10, causing the vapor to condense and run back into the system to absorb heat from the nuclear waste material being stored and again repeat the evaporation/condensation cycle. As noted above, such heat transfer does not also occur in the region between the hot end 12 and the cooling section 9 because the gap between the inner pipe 7 and the formation is filled with insulative material 11.

As shown in FIG. 3, the borehole temperature adjacent the center of the waste container will depend upon the age of the spent nuclear fuel and the boiling and condensation temperatures of the liquid in the heat dissipating pipe. However, even for the same material, the condensation and boiling temperatures will vary in proportion to pressure. Because the system is closed, that is because the pipe is a simple pipe closed at both ends, increased heat will result in increased pressure, thus changing the boiling and condensation points for the liquid.

In practice, the boiling point of the liquid in the system will vary between 110 and 160 degrees Centigrade, while the condensation temperature will also vary between 110 and 160 degrees Centigrade, but not necessarily with the same variance because boiling occurs at the bottom of the pipe while condensation occurs in the cooling region. Accordingly, proving out the design requires that the system be simulated over a range of boiling points. Curves A through F in FIG. 3 were based on the following parameters:

| Curve | Boiling Point (°C.) | Condensation Temperature (°C.) |
|---|---|---|
| A | 110 | 110 |
| B | 120 | 120, 110 |
| C | 130 | 30, 120, 110 |
| D | 140 | 140, 130, 120 |
| E | 150 | 150, 140, 130 |
| F | 160 | 160, 150, 140 |

To a certain extent, the above system will be self-regulating, and over the course of time, depending upon the amount of heat to be generated, increasing amounts of heat will cause the system to shift its operational characteristics from Curve A to Curve B to Curve C and so on through Curve F.

In connection with this, it is noted that the inventive system, as illustrated, for example, in FIG. 1(*a*) has a certain amount of redundance. In particular, it is noted that some of the boreholes 3 have a single heat dissipating pipe 8 associated with them while others have two pipes associated with them. In the event of a single heat pipe failure, the heat conductivity of the material between adjacent boreholes 3 will result in the added load being shifted to other adjacent heat dissipating pipes 7. In such an event, if the system were operating along characteristic Curve B, for example, it may rise to Curve C or Curve D to maintain cooling with the additional load.

Figure 4A:
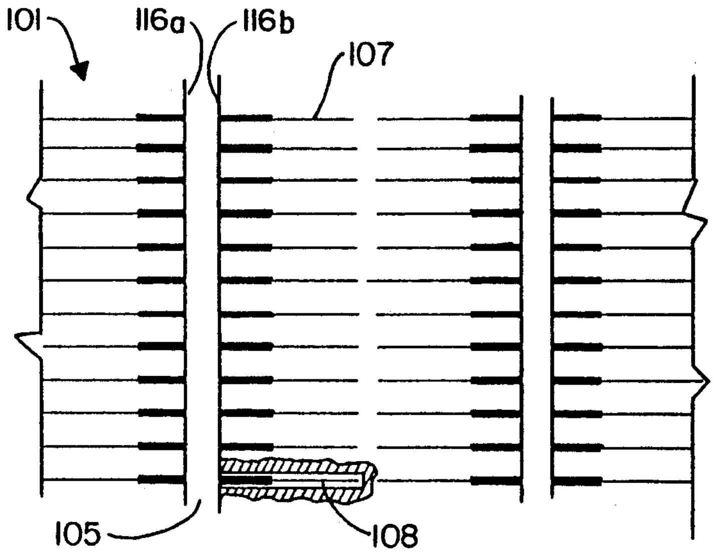
FIGS. 4(*a*) and 4(*b*) illustrate an alternative inventive arrangement using horizontal waste containers with long cooling enhancement devices.
Figure 4B:
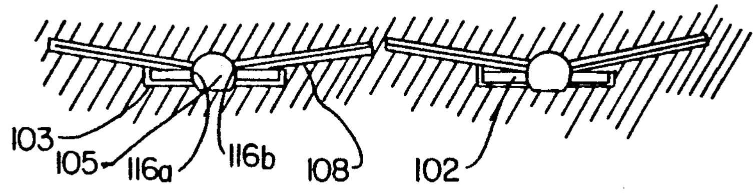

An alternative embodiment is illustrated in FIG. 4. Generally, similar parts or parts performing analogous, corresponding or identical functions are numbered herein with numbers which differ from those of the earlier embodiment by multiples of one hundred.

FIG. 4 shows another preferred concentrated container layout applying horizontal container emplacement. The container boreholes 103 are driven into both side walls 116*a–b* of the emplacement drifts 105 and the cooling enhancement devices 107 are emplaced into 60 meter long straight horizontal or slightly inclined boreholes 108. The container emplacement boreholes 103 are spaced 2.5 meters apart, while the drifts are 120 meters apart. In this way, 17% more containers are emplaced in the site area than in the example of FIGS. 1*a–b*. The first cooling enhancement device considered for this container arrangement is again a heat pipe.

Figure 5:
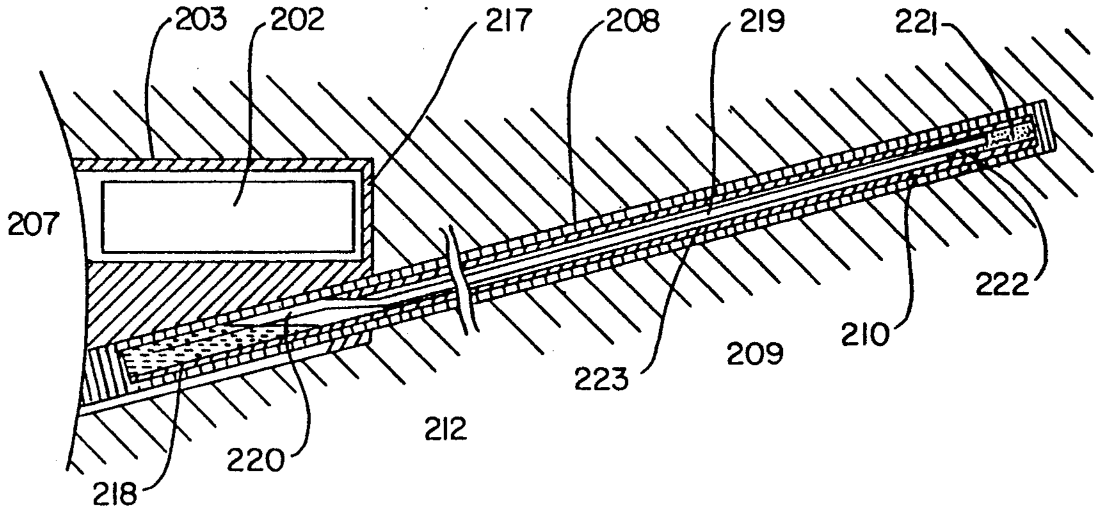
FIG. 5 is heat pipe provided with a central artery and connected to a horizontal container for use with the arrangement of FIG. 4(*a*)

It is also possible to use an arterial tube inside a gravity-assisted heat pipe to separate vapor and condensate and to avoid entrainment. This structure is shown in FIG. 5. The diameter of the drill hole 208 is 0.1 meters providing sufficient room for the enhancement device 207 which, after emplacement, is cemented into the drill hole 208 over its full length, using a heat conducting fill 210. Elastic or elastoplastic fill can also be used to compensate for the deformation of the borehole.

The hot end 212 of the cooling heat pipe runs approximately parallel and close to the container borehole 203 in order to absorb the nuclear decay heat of the container 202. For added advantage, a borehole lining 217 is used, which is connected to the hot end 212 of the heat pipe and designed in the form of a heat bridge of low thermal resistance. Low thermal resistance can be achieved using metal or composite material containing carbon fiber. Other connections to the container borehole are possible e.g. in the form of a coiled hot end wrapped around the outside of the borehole lining to uniformize the heat field around the container. Moreover, if a composite material of super heat conductivity is used, the effect of the composite material in uniformizing the heat field makes even a straight cooling heat pipe hot end more effective.

At the hot end 212 of the heat pipe, the recirculating liquid contents 218 of the cooling enhancement device 207 evaporates and the vapor 220 flows in the central artery 219. At the farthest end 221, vapor or vapor/liquid mixture is cooled and returns through annulus 222 and wick structure 232. Along the cooling section 209 of the heat pipe condensation takes place and the flow of the condensate is driven by gravity and capillary forces.

Figure 6:
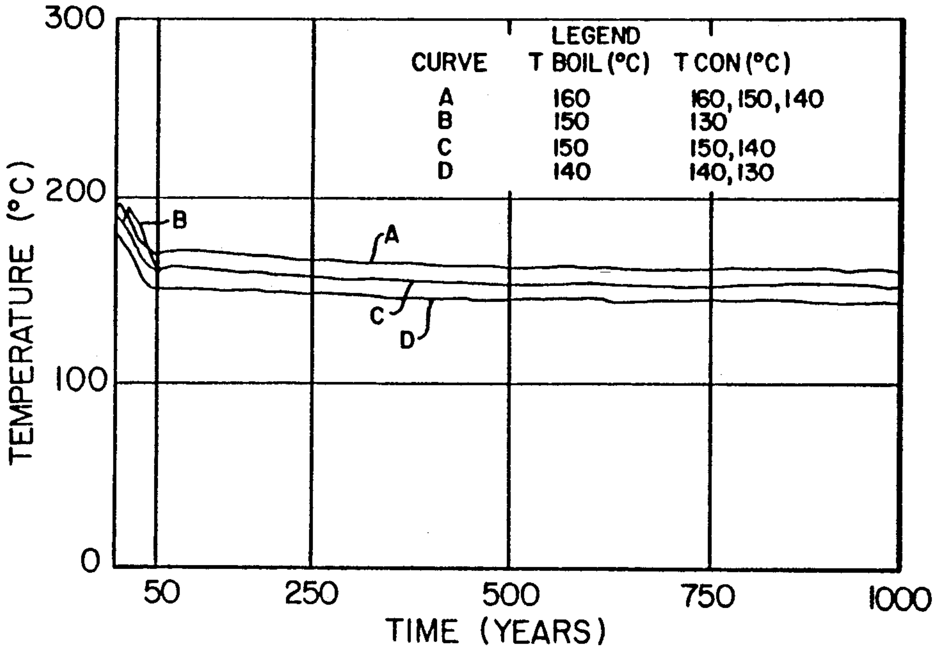
FIG. 6 is the container borehole hot-spot temperature characteristic for the arrangement shown in FIG. 4 using heat pipes.

The effect of the artery within the heat pipe, however, was not included in the thermal simulation where worst-case assumptions are made. According to the calculations, an excellent solution can be achieved using heat pipes with evaporation temperature, $T_{boil}$ of 150° C., and condensation temperatures $T_{cond}$ of 130° C. These temperatures correspond to 0.27 MPa (39.3 psia) vapor pressure along the cooling section, and a 0.21 MPa (30.5 psi) overpressure around the water-filled hot end. This overpressure provides the pressure head for fluid and vapor recirculation, and it also includes the hydrostatic pressure due to the inclination of the heat pipe. The maximum recirculating mass flux rate is less than 0.001 kg/s. This allows the use of rather small flow cross section areas for both vapor and liquid, and a skilled person can design an appropriate heat pipe to meet these constraints. FIG. 6 shows the maximum borehole temperature which is considerably below the allowable 275° C. specified in the Site Characterization Plan for the Yucca Mountain Waste Site in Nevada.

Since the heat pipes are sealed and their volume is approximately constant, the working pressure and the corresponding $T_{boil}$ and $T_{cond}$ temperatures will increase with an increase in the surrounding rock temperatures. This feedback mechanism provides an important safety factor in the operation of the heat pipes, as described herein, namely, that a spontaneous transition from curve D towards curve A will occur, as shown in FIG. 5. This will prevent an "overburn" of the heat pipes where the expression "overburn" describes an incapacity to condense vapor and provide a vapor-liquid recirculation.

It is interesting to compare the present results with those obtained in the previous example which assumed short vertical container emplacement holes and heat pipes for cooling enhancement. In this previous example, the most favorable solution gave a 161° C. peak temperature, which is 17% lower than the presently obtained 195° C. The reason for obtaining a higher temperature with the new arrangement is that it includes 17% more containers with a consequently higher heat load.

Figure 7:
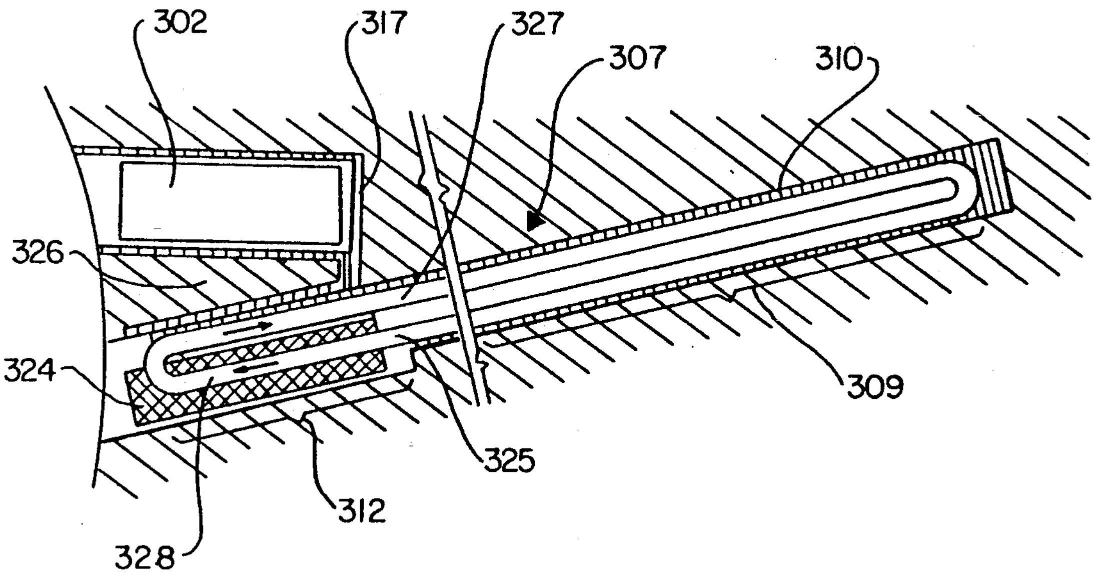
FIG. 7 is a section of a thermal syphon used with a horizontal container system.

One-phase thermal syphons, shown in FIG. 7, represent another mechanism for realizing cooling enhancement. The connection of a thermal syphon 307 to the repository site is identical to that described for a heat pipe along the cooling section 209. At the hot end, a thermal insulation 324 is applied around the return tube 325 while a good thermal contact is provided between the container area 326 and the forward tube 327. Good thermal contact can be achieved using heat conducting fill or cement 310, or a tight fit into the rock. A heat conducting container borehole lining 317 can also be used with an extension for providing good thermal contact.

The working fluid 328 circulates inside the sealed loop at an appropriate pressure to suppress boiling. Since recirculating liquid, e.g., water may be used, this device will not act as a temperature stabilizer, but instead, as a variable-resistance coupling between the hot end 312 and cold end 309 wherein the thermal resistance is a function of the closed-loop buoyancy pressure integral, which in turn is a function of the temperature distribution along the fluid circulation loop.

Figure 8:
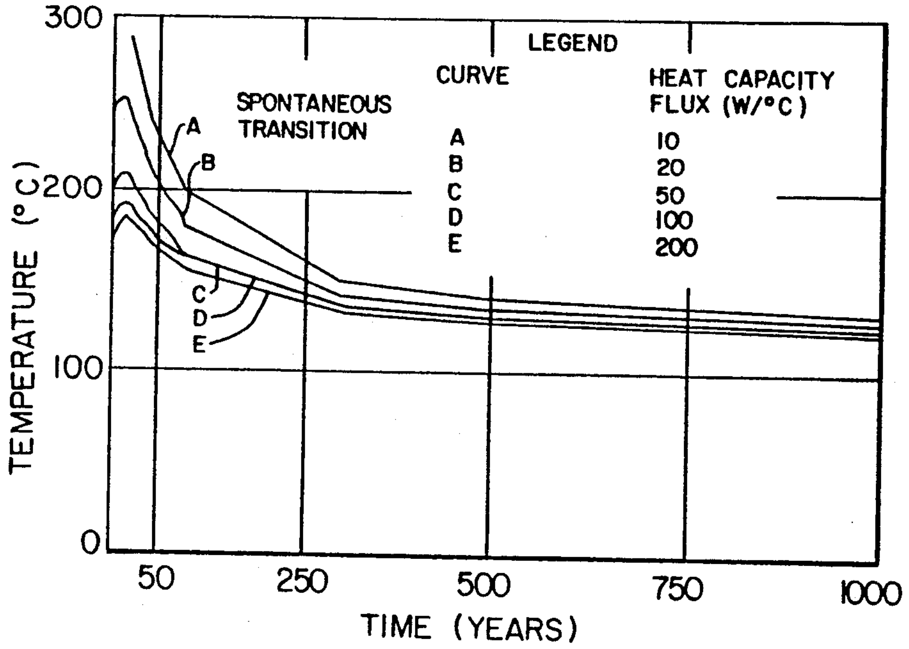
FIG. 8 is the characteristic container borehole hot-spot temperature using thermal syphons.

A detailed thermal and hydraulic computer simulation analysis was performed, on the embodiment of FIG. 2. In the numerical model, 0.03 meter inside diameter piping and 120 meter loop length (forward plus return path) were considered, and the working fluid was water. It was shown that during the thermal operation of the thermal syphons built into the repository site, a spontaneous transition will occur from a low flow rate towards an appropriate flow rate inside the thermal syphon resulting in a stable working point, for which the buoyancy and friction pressures are equal. It was also shown that the container borehole temperature remains definitely below curve D in FIG. 8 for the first 47 years, and will shift gradually towards curve C, which will not be reached within a 1000 year period. Therefore, the maximum borehole temperature will remain below 195° C., the same peak temperature obtained for the heat pipe cooling enhancement device. The simulation thus appears to clearly demonstrate that the entire repository site is efficiently and almost evenly heated when this enhancement device is used.

The application of superconducting composite materials represents another alternative to realize a cooling enhancement device. Advanced pitch fibers have approximately three times higher conductivity than pure copper. A detailed thermal analysis was performed to find the relationship between the rod cross sectioned area and the resultant temperature reduction. It was shown, that at least a 0.2 square meter cross section was needed to achieve a satisfactory cooling enhancement, and to provide a maximum borehole temperature below 275° C. This cross section seems large enough to be considered less advantageous when compared to the heat pipe or thermal syphon solution.

Figure 9:
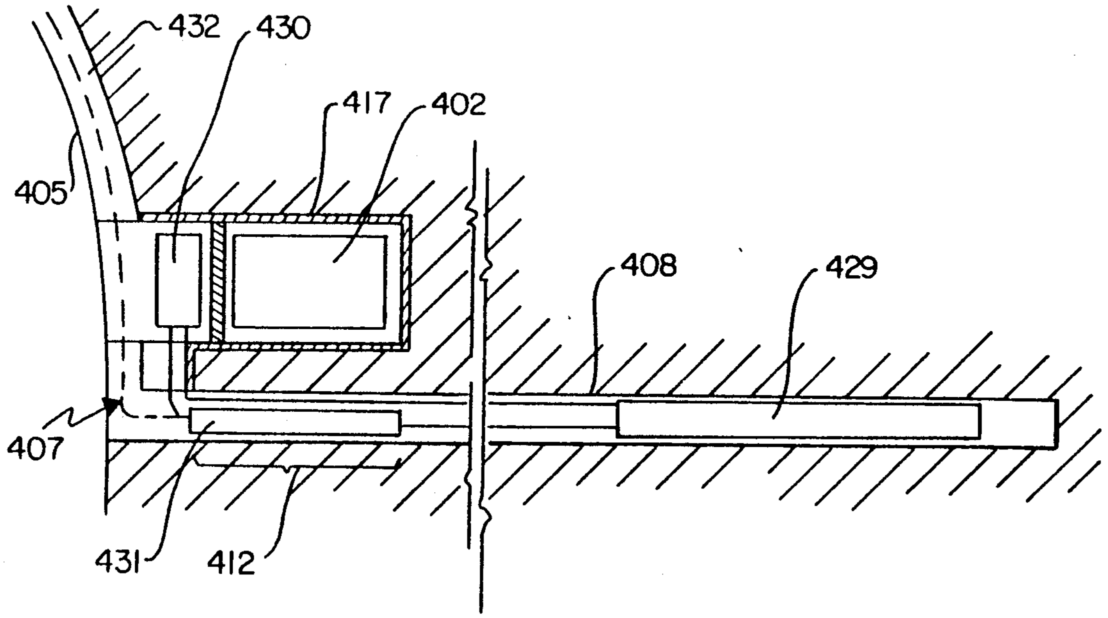
FIG. 9 is an absorption heat pump connected to a horizontal container.
Figure 10:
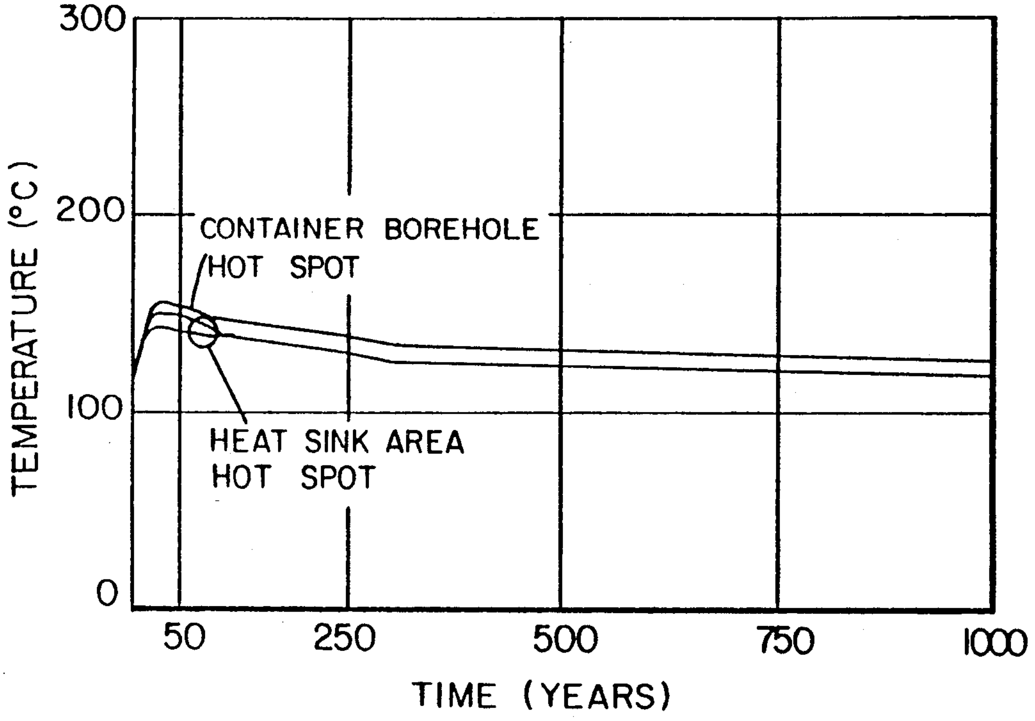
FIG. 10 is the temperature field in the repository area using heat pumps.

Finally, heat pumps may be used as cooling enhancement devices, as shown in FIG. 9. The condenser 429 of the heat pump is positioned in, and in thermal contact with, the sides of the drill hole 408 in an identical way described for a heat pipe or a thermal syphon. The absorption compressor 430 of the heat pump is attached to the borehole lining 417 for good thermal conductivity. The evaporator 431 of the heat pump can be either cemented into the hot end 412 of the drill hole 408, or extended into a groove 432 of the surface of the drift 405. A worst-case thermal analysis was performed assuming a coefficient of performance of four for the heat pump. This arrangement provides an almost uniform temperature distribution over the site area, shown in FIG. 10. The temperature is still slightly higher in the container area than in the heat sink area, indicating that the heat pumping is supplemented by conduction in the rock mass. It is also possible to cool down the surface area of the emplacement drift below the container borehole temperature with the evaporator of the heat pump. This technique is illustrated in FIG. 9 but was not included in the simulation.

A second set of heat pipes, thermal syphons or superconductor rods, positioned vertically close to the drift sidewalls can further reduce drift surface temperatures and air cooling requirements during regular maintenance, monitoring or retrieval. A set of long cooling enhancement devices arranged radially around a drift, a shaft or an underground silo can also be used to keep container temperature low in the waste repository.

In accordance with the invention, numerous advantages are achieved.

Relative to maximum borehole temperatures, high-density waste container emplacement in short horizontal or vertical holes with cooling enhancement is a feasible alternative to the presently considered emplacement layout proposed for the nuclear waste site at Yucca Mountain, Nev. Temperatures can be kept below 180°-200° C. using a variety of horizontal cooling enhancement devices. In the two layouts analyzed, the number of emplacement drifts are reduced by 70% from those presently planned, while the number of containers is increased by 17% in the second example, assuming the same overall emplacement area. The reduction in both the emplacement area and maximum temperatures contributes to improving the design and reducing the construction necessary for a retrievable, monitored, semi-permanent repository.

Closed-loop thermal syphons with primarily one-phase liquid heat transfer, cemented in 60 m long holes, represent the best solution for providing temperature control to the containers. Slightly gravity-assisted heat pipes can also be used as cooling devices, resulting in approximately the same hot-spot temperatures as those obtained using thermal syphons. Heat pumps can provide the best cooling enhancement for the price of a more complicated system. No power input is necessary since nuclear decay heat can drive the cooling cycle.

If cooling enhancement is applied to the conventional, low-density emplacement, both drift surface temperatures and air cooling requirements can be greatly reduced. Since heat pipes and one-phase thermal syphons are approximately equally efficient, the following additional evaluation is provided in order to compare them.

The advantage of using a heat pipe rests in its unique temperature characteristics. This feature is illustrated in FIGS. 3 and 6. It is feasible to design and manufacture water-filled heat pipes which closely approximate the idealized characteristics used in the thermal simulation. Water-filled heat pipes with compatible non-corrosive piping materials have been extensively studied in the United States, and the results can contribute to the development of the required cooling enhancement scheme. The application of gravity assistance reduces the constraints in the wick design, and allows use of small cross sections. Another advantage which can be utilized is the use of a central artery to transfer vapor along the heat pipe towards the cold end. At this end, heat can be first released at the farthest distance from the container emplacement first, with the heat release working its way back towards the container. This reversed heat dumping could further reduce the drift surface temperature for the first few decades.

Figure 11:
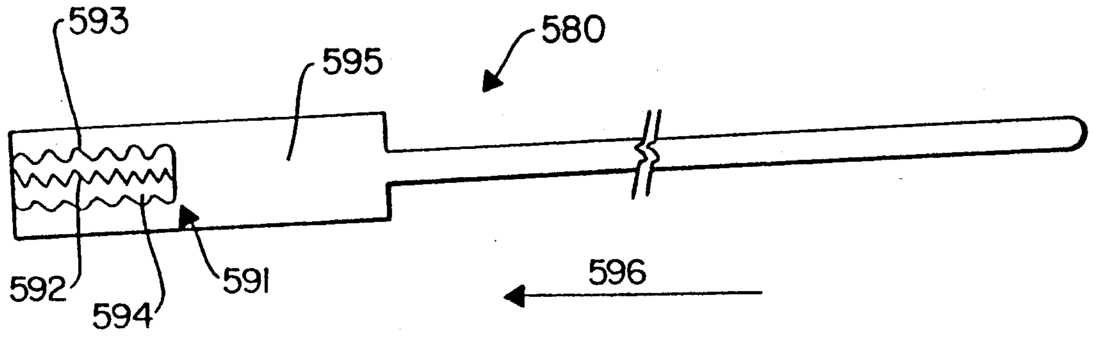
FIG. 11 is an illustration of an alternative cooling pipe useful in accordance with the present invention.

The disadvantage of a heat pipe is the possibility of instability in the operation. Avoiding overburning, and the starting up of circulation are two classic problems associated with heat pipe operation. Due to these difficulties, a special heat pipe may be used, that starts operation as a thermal syphon and transfers to a gravity-assisted heat pipe operational mode when the hot-end temperature exceeds the water saturated temperature. This can be achieved in accordance with the pipe illustrated in FIG. 11. Here the illustrated pipe 580 includes an expansion chamber 591 built into the hot end section defined by a compressible member 593 which encloses a void 594. The remaining volume 595 of pipe 580 is filled with liquid. Initially, the pipe is completely filled with liquid but as pressure increases part of the liquid inside the pipe vaporizes forcing spring 592 to be compressed in the direction indicated by arrow 596, thus increasing the volume of the pipe under the force of vapor pressure and converting the one-phase system into a two-phase system. The existence of a short vapor column in the vicinity of the container can propel water flow along the circulating loop. Therefore, the effective length of the heat pipe will be restricted to the first few meters. This solution represents a combination of a heat pipe and a thermal syphon within one device.

The advantage of using a thermal syphon is its known operating stability. As shown in the thermal analysis, it is feasible to propel appropriate water flow by natural buoyancy to keep the containers adequately cool. The flow cross section area is still acceptable for the device to be inserted into a hole of 0.1 m diameter. Used in combination with heat pipes, it can result in a reduction of the required flow cross section area.

In accordance with the present invention it is imperative to note that proper operation of the system requires that the cooling enhancement pipe in a two-phase system not contain any nonliquifiable material such as air. Therefore, it is important that the pipes be prepared with care. For practical reasons this means that the same must be prepared in a factory remote from the point of installation. Because of the length of the pipes, it is not practical for them to be carried down to this site in the form illustrated in the figures. Therefore, it becomes necessary to address this problem in a simple and efficient manner.

Figure 12:
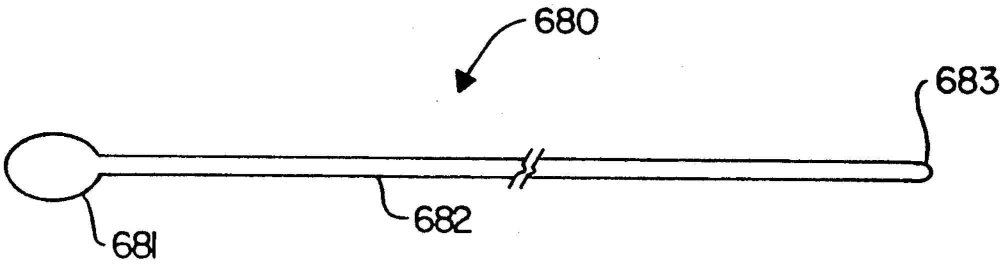
FIG. 12 is yet another alternative embodiment of a cooling pipe useful as a cooling enhancement device in accordance with the present invention.
Figure 13:
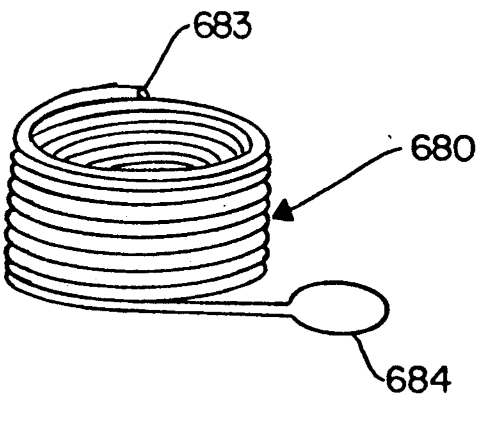
FIG. 13 is a view of the cooling enhancement device of FIG. 12 in a coiled state ready for easy transport to the cooling enhancement borehole site.

In accordance with the present invention the same is achieved by providing a cooling pipe such as that illustrated in FIG. 12. This cooling pipe 680 generally includes a bladder 681 and an elongated section 682. The elongated section 682 is made of a bendable material which allows it to be put into the form of a coil as illustrated in FIG. 13. When it is desired to use the coiled pipe it is carried down to the site and the closed end 683 is carefully unwound and inserted into the appropriate borehole.

Figure 14:
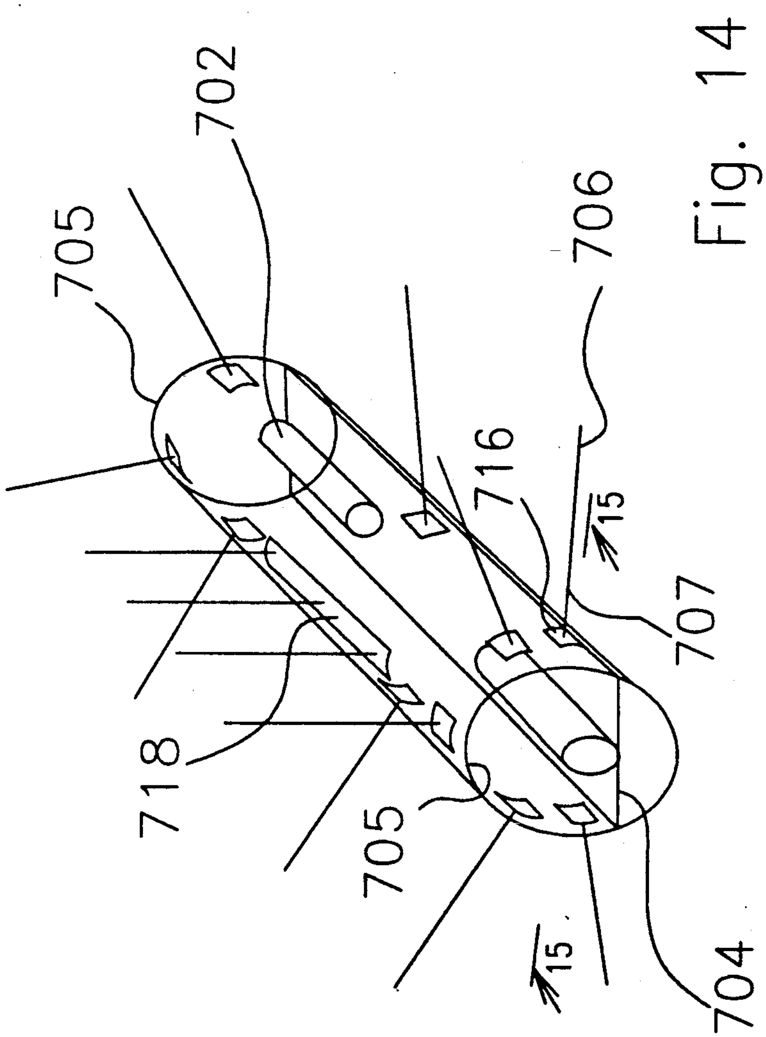
FIG. 14 is a perspective view of yet another inventive drift tunnel for use in storing spent nuclear waste.
Figure 15:
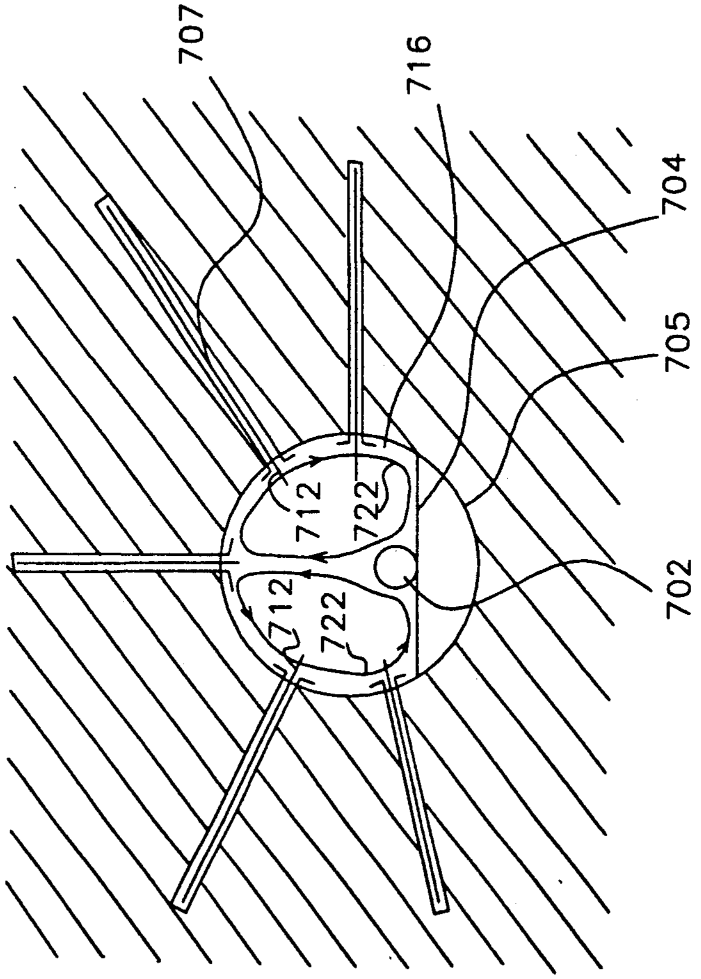
FIG. 15 is a view along lines 15—15 of FIG. 14.

Referring to FIGS. 14 and 15, yet another alternative approach is illustrated. The arrangement illustrated in these Figures differs from that of the prior embodiments insofar as the units 702 of waste are not positioned in boreholes but rather merely lie on the bottom of the drift tunnel 705.

Still another difference between the embodiment of FIGS. 14 and 15 as compared to the earlier described embodiments is the use of rock bolts 706 with bearing plates 716 or mats 718.

Generally, in the case of many rock formations, it is necessary to use rock bolts and bearing plates in order to maintain the integrity of the structure. In the case of particularly fractured and jointed rock formations, mats are required in order to prevent drift deterioration in the form of flaking or spalling.

While rock bolts take a wide variety of forms, in accordance with the present invention it is contemplated that the rock bolt will take the form of a hollow pipe, thus providing the opportunity for a cooling enhancement device to be placed therein in the manner illustrated by cooling enhancement device 707 in FIG. 15. Thus, the hot ends 712 of cooling enhancement devices 707 may project into convection currents 722 which will be created as a natural result of the heat contained within waste units 702.

As is discussed above, a major objective in the inventive system is to achieve substantial reduction in hot-spot temperatures, and to provide a more uniform temperature field within a high-level waste repository. While cavity emplacement, using vertical or horizontal waste containers drilled from the emplacement drifts is particularly effective, as is illustrated by the embodiment of FIGS. 14 and 15 other methods for communicating heat to the cooling enhancement devices are useful.

Likewise, a range of cooling enhancement devices may be used, including, copper rods contained within the hollow rock bolts, inventive highly heat conductive advanced carbon fiber rock bolts, and the like. A heat pipe or other cooling enhancement device may be most advantaneously intergrated into a rock bolt to achieve efficiency of installation and minimum disturbance of the formation by performing both reinforcement and installation of cooling enhancement in a single installation step.

As discussed above, the inventive system allows the increase of waste heat load or decrease in the size of the emplacement area without exceeding a specified maximum temperature around the waste bearing storage drift tunnel. This also results in an added benefit in the form of enhanced rock drying and/or favorable stress distribution.

In principle, the structural integrity of a drift tunnel depends upon the support of the overlying rock strata by the region of the formation immediately above the drift tunnel. While, in perhaps a few structures of the type found in nature the arcuate roof of the drift tunnel itself will provide a strong structural member, in practice the irregularaties and defects in the materials which form the formation seldom allow for this to be a dependable structure. In accordance with the invention, it is comtemplated that heat will be channeled into the region of the formation immediately above the drift tunnel to a distance of several meters, causing an expansion in this region and, effectively an arcuate compressed support region of great strength which results in shifting stress away from the roof the drift.

It is noted that one of the advantages of the inventive system is the fact that no external ventilation is required. However, such ventilation, in moderation, can yet further increase the density with which heat is dissipated. In principle, during the first few decades of nuclear waste storage, the containers holding the waste, and the overall system are at their peak condition and are highly resistant to mechanical and environmental stresses. Accordingly, the possibility of contamination is extremely low. One of the factors which may create a problem, however, is the presence of moisture in the rock formation. In accordance with one embodiment of the invention, it is contemplated that air from the tunnels will be ventilated for a period of time, typically 10-30 years, when, because of the newness of the system, failure is least likely to occur. Moreover, the introduction of ventilation results in ejecting moisture from the system as the heat of the nuclear waste causes it to evaporate. This results in lowering the humidity in the drift tunnel and thus slowing deterioration of the system and reducing the probability of system failure due to corrosion. In addition to slowing or perhaps completely eliminating corrosion, the drying of the formation will also have the effect of substantially preventing migration of any escaped radioactive particles, or at least substantially slowing down their movement.

Preferably such ventilation is substantially contained within a closed system to restrict any egress of radioactive contaminants to the atmosphere. Desirably up to about 15 to 20% of the recirculated air may be bled off for the initial limited period, in a controlled manner, to remove moisture, the bleed being replaced by fresh dry air. Optionally, also, the bleed is not freely ventilated to atmosphere, but is processed, for example, by condensing out or otherwise drying the bled or removed air. If dried in this manner, with the moisture removed, again in a controlled manner, the bled-off air can then be recirculated into the closed system.

After this initial period, outside ventilation may be discontinued and will, in any case, be unnecessary due to the fact that the process has resulted in substantially drying out the rock formation and even the smaller amount of heat leaving the spent fuel in later years will be sufficient to keep the dried out formation dry in substantially the same volume for a number of years and in progressively smaller volumes as the waste decays to relatively non-radioactive materials during the several thousand year long decay cycle.

In addition, as noted above, a wide range of heat dissipating devices may be used including recirculating air convection, direct attachment using heat conduction between the waste container or other unit and, for example, a liquid/vapor cooling enhancement device of the type described above or ventilation. In addition, the hot end of a cooling enhancement device may be provided with heat conductive metal fins to increase the conduction of heat from hot air to the cooling enhancement device. Such an approach may be particularly effective in the context of a system such as that illustrated in FIG. 15 where the cooling enhancement device is incorporated within a conventional rock bolt and thus provides the double function of formation reinforcement and cooling enhancement.

As is illustrated by the above examples, several methods of cooling may be combined and result in cooperative effects. For example, in the case of ventilating, the increased movement of air also results in enhanced heat transfer to the cooling enhancement device as compared to a passive convection system. In accordance with the present invention, it is contemplated that such ventilating may be accomplished with the aid of fans or the natural buoyancy of hot air. In addition, shields made of sheet metal may be placed about waste containing units for the purpose of directing the air flow into desired directions and, at the same time, to reduce thermal and radionuclei radiation towards the drift transportation area, for example, as well as to shelter them from descending moisture. While these solutions are specific to drift emplacements, they apply equally as well to cavity emplacement of waste as well as other approaches as will be illustrated below.

Still another advantage of the system is the fact that insofar as rock bolting also effectively provides the opportunity for installation of cooling enhancement without further disturbance of the formation, the overall integrity of the system is increased.

Returning to the detail of the embodiment of FIGS. 14 and 15, it is contemplated that units 702 may take the form of containers having a diameter of 0.7 meters and a length of 2 meters, and enclosing heat generating vitrified, or other nuclear waste. In contrast to the embodiments in the earlier figures, it is contemplated that the rock bolt will have relatively small dimensions possibly on the order of 0.025 meters to 0.075 meters. Because of the relatively high density of rock bolts, it is expected that the length of the cooling enhancement devices may be as small as 1 meter, although longer devices will have advantages. Similarly to prior art rock bolting systems, it is contemplated that the rock bolts containing the cooling enhancement structure would be jam-fitted into holes and held in place by friction. Naturally, this would be done prior to emplacement of waste.

In the case of carbon fiber cooling enhancement rock bolts, assuming that the device has a heat conductivity of 800 W/m K, and a diameter of 0.075 meters, and a device density of 1 per square meter, the effective conductivity of the rock-bolted volume will be increased by 275%.

If a heat pipe is used, temperature differences are expected to be in the range of 10°-30° C. between the hot end and the cold end of the cooling enhancement device, making an even stronger contribution to heat transport enhancement.

Figure 16:
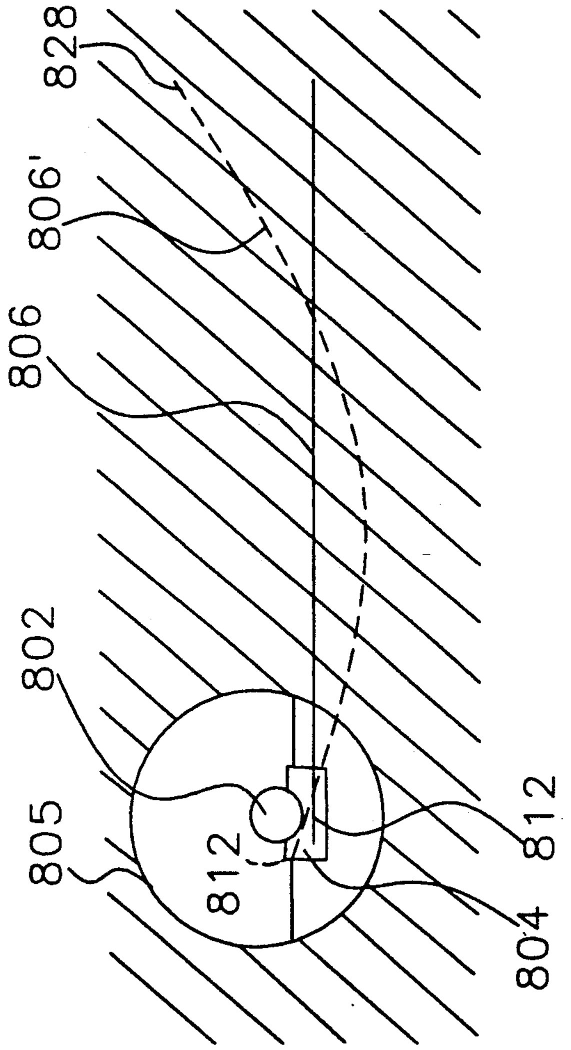
FIG. 16 is yet another alternative system for dissipating nuclear waste heat.

Referring to FIG. 16, waste unit 802 is contained in a drift tunnel 805 which is provided with a cooling enhancement device 806 which is coupled by a heat conducting device 804 at its hot end 812 to waste container 802. The heat conductor or thermal bridge 804 can be designed to provide a low temperature difference, e.g. 20° C.-50° C., between the waste container surface and the hot end. The heat is then removed along the length of the cooling enhancement device to its opposite cold end, which is emplaced in the heat absorbing formation. This solution can be advantageous if large containers dissipating 5-20 kilowatts of heat are emplaced in the drift.

As alluded to above, if a heat pipe is positioned horizontally, or with its cold end 828 lower than its hot end 812, the heat flux transported by the cooling enhancement device will be restrained by the limitations of capillary action. Therefore, it is advantageous to install the heat pipe into a slightly upward position to provide gravity assistance to the internal recirculation.

However, from the viewpoint of possible water movement in the rock formation, an upward-drilled hole from the drift tunnel may be disadvantageous as it could channel water into the drift, unless the gap around the rock bolt is well sealed. This problem may be alleviated by the use of an arcuate cooling enhancement device 806' as is illustrated in phantom lines in FIG. 16. In the case of such an arcuate design, the distance between the cold end 828 and the hot end 812 would be selected in the vertical direction to be sufficiently small that the combined action of drippage through the formation and the capillary suction of the system about the cooling enhancement device would balance any tendency of liquid to enter the drift.

Figure 17:
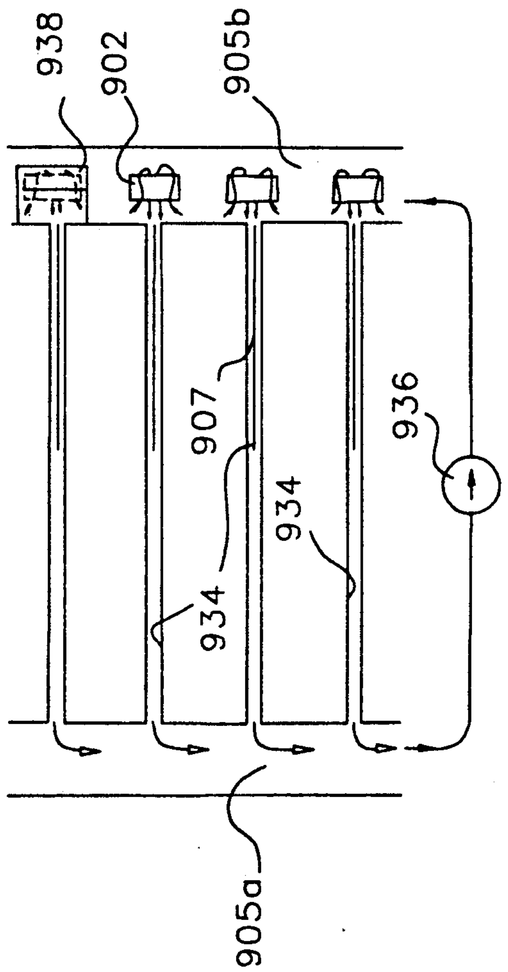
FIG. 17 is yet another alternative drift tunnel plan using the inventive cooling enhancement system.
Figure 18:
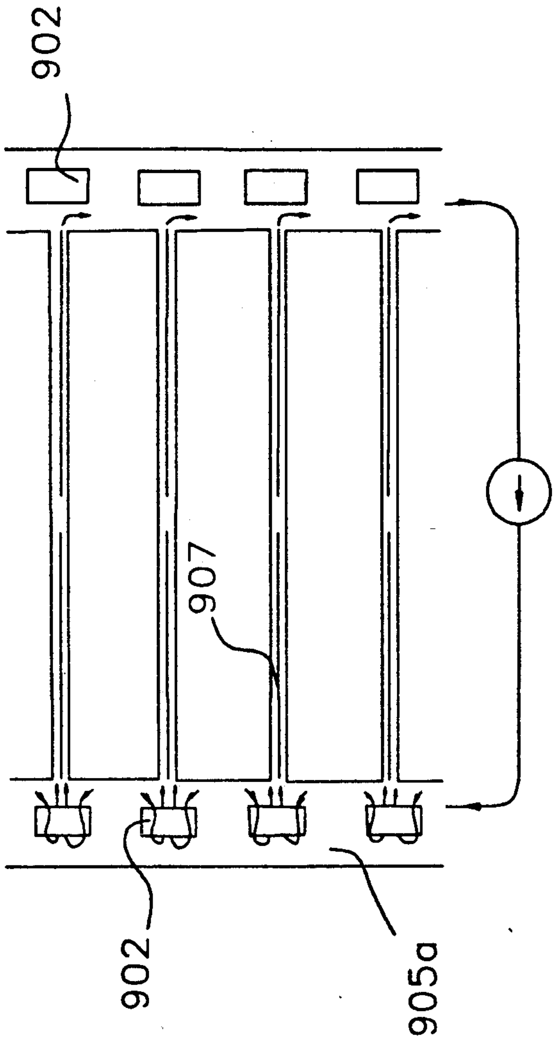
FIG. 18 is a plan similar to FIG. 17 utilizing symmetrical cooling enhancement.
Figure 19:
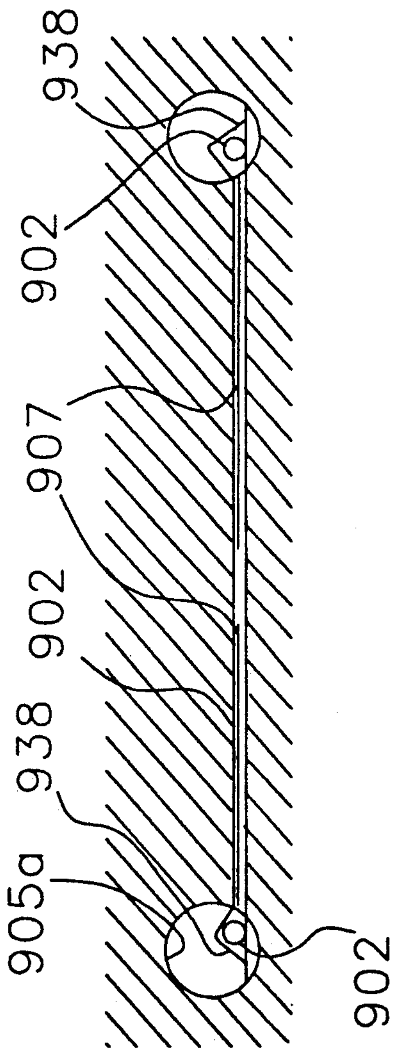
FIG. 19 is a cross-sectional view along lines 19—19 of FIG. 18.

Still another approach is illustrated in FIGS. 17-19. More particularly, as is illustrated in FIG. 17, a pair of drift tunnels **905*a* and 905*b* are in fluidic communication with each other via a plurality of ducts 934. A fan 936 may be used to circulate air between the two drift tunnels by providing a return path and a pressure differential between the two tunnels. Alternatively, the tunnels may be put at different heights with drift tunnel 905*a* at a higher level, whereby natural convection will result in the convective circulation of air and fan 936 may be replaced by simple return duct. The embodiment of FIG. 18 is substantially similar to the embodiment of FIG. 17, except that waste containers 902 have been placed in both drift tunnels. In addition, FIG. 18 illustrates that ventilation may be provided in either direction. The emplacement illustrated in FIG. 18 may also be viewed as the second stage of an emplacement process which would first take the form illustrated in FIG. 17**.

As is illustrated most clearly in FIG. 19, a metal deflector shield 938 may be provided in order to channel air at relatively high velocity in the vicinity of waste containers 902, and to protect them from water drippage.

In connection with the reversal of air flow, it is noted that such reversal will have the advantageous effect of improving the drying of the rock formation. This is particularly critical during the initial decades of storage.

In connection with the embodiment of FIGS. 17-19, several operational aspects merit discussion at this point. More particularly, this system operates with air as the coupling agent for heat. Typically, one would expect air which is being used to provide cooling to be circulated at relatively high speed. This is generally a system requirement because of the very low heat capacity of air. In principle, the low heat capacity of air is made up for by providing a great volume of air moving past an object to be cooled at relatively high speed. Thus, if one were to consider a system without a cooling enhancement device such as a heat pipe, relatively high air speed would be required and perhaps electrically-powered fans 936 would be required. On the other hand, the use of heat pipes results in quicker movement of heat from the hot end of the cooling enhancement device to its cold end. Thus, the temperature gradient between, for example, slowly moving passive, convective air is relatively great, as compared to a system without cooling enhancement. Because the temperature difference at the hot end is greater, more of the capacity of the air to contain heat is used during the cooling cycle.

While an illustrative embodiment of the invention has been described above, it is, of course, understood that various modifications will be apparent to those of ordinary skill in the art. Such modifications are within the spirit and scope of the invention, which is limited and defined only by the appended claims.

We claim:

1. A long-term repository system for the storage of heat generating spent nuclear fuel, comprising:

(a) a mechanically stable geological formation constituting a natural barrier system for said spent fuel;

(b) a drift tunnel defined in said geological formation, said drift tunnel having a height and a width, and a length much greater than said height and said width:

(c) a plurality of containers of spent, heat generating nuclear fuel, said containers being positioned in said drift tunnel, said drift tunnel and container characteristics being such that each container heats a section of said drift tunnel wall;

(d) at least three elongated heat transfer boreholes having a length and having an average cross-sectional width much smaller than said length and extending from said heated drift tunnel wall section into a heat dissipation region in said geological formation, said at least three heat transfer boreholes and said heat dissipation region extending around said drift tunnel in a vertical sense; and (e) a plurality of elongated heat transfer devices extending into and through each said elongated heat transfer borehole to said heat dissipation region to transfer heat from said heated drift tunnel wall section to said heat dissipation region.

2. A long-term repository system for the storage of heat generating nuclear spent fuel as claimed in claim 1, wherein the moisture content of said geological formation is reduced by ventilating said drift tunnel.

3. A long-term repository system for the storage of heat generating nuclear spent fuel as claimed in claim 2, wherein said ventilation of said drift tunnel is enhanced by means of elongated two-phase evaporative heat-transfer devices emplaced in airways for said ventilation.

4. A long-term repository system for the storage of heat generating nuclear spent fuel as claimed in claim 1 wherein said heat transfer devices are incorporated into hollow rock bolts.

5. A long-term repository system for the storage of heat generating nuclear spent fuel as claimed in claim 1 comprising an array of said heat transfer boreholes and devices disposed generally in a vertical plane to extend outwardly from a container, at least one said borehole and associated heat transfer device extending upwardly in a substantially overhead position.

6. A long-term repository system for the storage of heat generating spent nuclear fuel as in claim 1, wherein said drift tunnel is at one level, and connected, by slanted ducts containing cooling enhancement devices, to another drift tunnel at another level.

7. A long-term repository system for the storage of heat generating spent nuclear fuel, comprising:

(a) a mechanically stable geological formation constituting a natural barrier system for said spent fuel;

(b) a drift tunnel defined in said geological formation, said drift tunnel having a height and a width, and a length much greater than said height and said width:

(c) a plurality of containers of spent, heat generating nuclear fuel, said containers being positioned in said drift tunnel;

(d) a plurality of elongated heat transfer boreholes having a length and having an average cross-sectional width much smaller than said length and extending from said drift tunnel into a heat dissipation region in said geological formation; and (e) a plurality of elongated heat transfer devices extending into and through each said elongated heat transfer borehole to said heat dissipation region to transfer heat thereto; and (f) controlled ventilation means to remove moisture from said drift tunnel; wherein the moisture content of said geological formation is reduced by ventilating said drift tunnel.

8. A long-term repository system for the storage of heat generating nuclear spent fuel as claimed in claim 7, wherein said ventilation is recirculatory and substantially contained within a closed system to restrict egress of radioactive contaminants to atmosphere.

9. A long-term repository system for the storage of heat generating nuclear spent fuel as claimed in claim 8 wherein about 15 to 20 percent of recirculated air is bled off to remove moisture and replaced by dry air.

10. A long-term repository system for the storage of heat generating nuclear spent fuel as claimed in claim 8 wherein said ventilation is intended to be conducted for a preliminary period not exceeding 30 years and then terminated.

* * * * *